United States Patent [19] [11] Patent Number: 6,000,010
Legg [45] Date of Patent: *Dec. 7, 1999

[54] METHOD OF INCREASING THE STORAGE CAPACITY OF A LEVEL FIVE RAID DISK ARRAY BY ADDING, IN A SINGLE STEP, A NEW PARITY BLOCK AND N—1 NEW DATA BLOCKS WHICH RESPECTIVELY RESIDE IN A NEW COLUMNS, WHERE N IS AT LEAST TWO

[75] Inventor: Christopher B. Legg, Oceanside, Calif.

[73] Assignee: Unisys Corporation, Blue Bell, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/853,968

[22] Filed: May 9, 1997

[51] Int. Cl.$^6$ .............................. G11B 17/22; G06F 11/20
[52] U.S. Cl. ................................ 711/114; 714/7; 711/170
[58] Field of Search .................................... 711/114, 170; 395/182.05

[56] References Cited

U.S. PATENT DOCUMENTS

| | | | |
|---|---|---|---|
| 5,502,836 | 3/1996 | Hale et al. | 711/170 |
| 5,524,204 | 6/1996 | Verdoorn, Jr. | 395/182.04 |
| 5,615,352 | 3/1997 | Jacobson et al. | 711/114 |
| 5,737,745 | 4/1998 | Matsumoto et al. | 711/114 |
| 5,748,885 | 5/1998 | Gallagher | 395/185.01 |
| 5,758,118 | 5/1998 | Choy et al. | 711/114 |
| 5,809,224 | 9/1998 | Schultz et al. | 395/182.05 |

OTHER PUBLICATIONS

Storage Dimensions (Artecon) "The impact of Dynamic Growth and Reconfiguration in a Real–World Environment" pp. 1–18 (entirety), Oct. 1996.

*Primary Examiner*—Eddie P. Chan
*Assistant Examiner*—Hong Kim
*Attorney, Agent, or Firm*—Charles J. Fassbender; Mark T. Starr; Steven B. Samuels

[57] ABSTRACT

The storage capacity of a Level Five RAID array on an initial set of disks is expanded by the steps of: A) adding to the rows of the array, new data blocks but no parity blocks which reside on an additional set of disks; and, B) initializing the new data blocks such that the exclusive-or of their content in each row of the array is zero. Due to these steps A) and B), the need to rewrite the original data blocks and parity blocks on the initial set of disks as part of the expansion process is eliminated, and thus the expansion of the array occurs quickly. Alternatively, the storage capacity of a Level Five RAID array on an initial set of disks is expanded by the steps of: A) changing a parity block to a data block in a particular row on the initial set of disks, without altering the content of the changed block; B) adding in that particular row, one new parity block and N–1 new data blocks which reside on an additional set of N disks; and, C) initializing that new parity block and new data blocks such that the exclusive-or of their content is zero. By these steps A–C, the need to rewrite the original data blocks and parity blocks on the initial set of disks is again eliminated; and further the additional set of disks contains a parity block as well as data blocks.

10 Claims, 10 Drawing Sheets

| | DISK 0 | DISK 1 | DISK 2 | DISK 3 | DISK 4 |
|---|---|---|---|---|---|
| ROW 0 → | P(0,1,10,11) | D0 | D1 | D10 | D11 |
| ROW 1 → | D2 | P(2,3,12,13) | D3 | D12 | D13 |
| ROW 2 → | D4 | D5 | P(4,5,14,15) | D14 | D15 |
| ROW 3 → | D16 | D6 | D7 | P(16,6,7,17) | D17 |
| ROW 4 → | D8 | D19 | D9 | D18 | P(8,19,9,18) |
| | ↑ | ↑ | ↑ | ↑ | ↑ |
| | COL. 0 | COL. 1 | COL. 2 | COL. 3 | COL. 4 |

P(0,1,10,11) ≡ P(0,1) —21→ D10 EXOR D11 = 0

P(2,3,12,13) ≡ P(2,3) —22→ D12 EXOR D13 = 0

P(4,5,14,15) ≡ P(4,5) —23→ D14 EXOR D15 = 0

D16 ≡ P(6,7) —24→ P(16,6,7,17) EXOR D17 = 0

D19 ≡ P(8,9) —25→ D18 EXOR P(8,19,9,18) = 0

|  | DISK 0 | DISK 1 | DISK 2 | DISK 3 | DISK 4 |
|---|---|---|---|---|---|
| ROW 0 | P(0,1,2,3) | D0 | D1 | D2 | D3 |
| ROW 1 | D4 | P(4,5,6,7) | D5 | D6 | D7 |
| ROW 2 | D8 | D9 | P(8,9,10,11) | D10 | D11 |
| ROW 3 | D12 | D13 | D14 | P(12,13,14,15) | D15 |
| ROW 4 | D16 | D17 | D18 | D19 | P(16,17,18,19) |
|  | COL. 0 | COL. 1 | COL. 2 | COL. 3 | COL. 4 |

FIG. 2 (PRIOR ART)

S1. TAKE THE FIG.1 ARRAY OFF LINE

S2. BACK-UP THE CONTENTS OF THE FIG.1 ARRAY TO TAPE

S3. GENERATE A NEW ARRAY CONFIGURATION MAP FOR DISK 0-4 PER FIG.2

S4. GENERATE NEW PARITY BLOCKS AND WRITE ON DISK 0-4

S5. RESTORE DATA FROM BACK-UP MEDIA TO DISK 0-4

S6. BRING THE FIG.2 ARRAY ON LINE

FIG. 3 (PRIOR ART)

|  | DISK 0 | DISK 1 | DISK 2 | DISK 3 | DISK 4 |
|---|---|---|---|---|---|
| ROW 0 | P(0,1,10,11) | D0 | D1 | D10 | D11 |
| ROW 1 | D2 | P(2,3,12,13) | D3 | D12 | D13 |
| ROW 2 | D4 | D5 | P(4,5,14,14) | D14 | D15 |
| ROW 3 | P(6,7,16,17) | D6 | D7 | D16 | D17 |
| ROW 4 | D8 | P(8,9,18,19) | D9 | D18 | D19 |
|  | ↑ COL. 0 | ↑ COL. 1 | ↑ COL. 2 | ↑ COL. 3 | ↑ COL. 4 |

FIG. 4

$$P(0,1,10,11) \equiv P(0,1) \xrightarrow{11} D10 \text{ EXOR } D11 = 0$$
$$P(2,3,12,13) \equiv P(2,3) \xrightarrow{12} D12 \text{ EXOR } D13 = 0$$
$$P(4,5,14,15) \equiv P(4,5) \xrightarrow{13} D14 \text{ EXOR } D15 = 0$$
$$P(6,7,16,17) \equiv P(6,7) \xrightarrow{14} D16 \text{ EXOR } D17 = 0$$
$$P(8,9,18,19) \equiv P(8,9) \xrightarrow{15} D18 \text{ EXOR } D19 = 0$$

|  | DISK 0 | DISK 1 | DISK 2 | DISK 3 | DISK 4 |  |
|---|---|---|---|---|---|---|
| ROW 0 | P,N1<br>P,N1 | D,N1,0<br>D,N1,1 | D,N1,2<br>D,N1,3 | D,N1,20<br>D,N1,21 | D,1,22<br>D,1,23 | BLOCK 0<br>BLOCK 1 |
| ROW 1 | D,N1,4<br>D,N1,5 | P,N1<br>P,N1 | D,N1,6<br>D,N1,7 | D,1,24<br>D,1,25 | D,1,26<br>D,1,27 | BLOCK 2<br>BLOCK 3 |
| ROW 2 | D,N1,8<br>D,N1,9 | D,N1,10<br>D,N1,11 | P,N1<br>P,N1 | D,1,28<br>D,1,29 | D,1,30<br>D,1,31 | BLOCK 4<br>BLOCK 5 |
| ROW 3 | P,N1<br>P,N1 | D,N1,12<br>D,N1,13 | D,N1,14<br>D,N1,15 | D,1,32<br>D,1,33 | D,1,34<br>D,1,35 | BLOCK 6<br>BLOCK 7 |
| ROW 4 | D,N1,16<br>D,N1,17 | P,N1<br>P,N1 | D,N1,18<br>D,N1,19 | D,1,36<br>D,1,37 | D,1,38<br>D,1,39 | BLOCK 8<br>BLOCK 9 |
|  | COL. 0 | COL. 1 | COL. 2 | COL. 3 | COL. 4 |  |

|        | DISK 0         | DISK 1         | DISK 2        | DISK 3        | DISK 4          |
|--------|----------------|----------------|---------------|---------------|-----------------|
| ROW 0  | P(0,1,10,11)   | D0             | D1            | D10           | D11             |
| ROW 1  | D2             | P(2,3,12,13)   | D3            | D12           | D13             |
| ROW 2  | D4             | D5             | P(4,5,14,15)  | D14           | D15             |
| ROW 3  | D16            | D6             | D7            | P(16,6,7,17)  | D17             |
| ROW 4  | D8             | D19            | D9            | D18           | P(8,19,9,18)    |
|        | ← COL. 0       | ← COL. 1       | ← COL. 2      | ← COL. 3      | ← COL. 4        |

FIG. 7

$$\left.\begin{array}{l} P(0,1,10,11) \equiv P(0,1) \\ P(2,3,12,13) \equiv P(2,3) \\ P(4,5,14,15) \equiv P(4,5) \\ D16 \equiv P(6,7) \\ D19 \equiv P(8,9) \end{array}\right\}$$

21 ↗ D10 EXOR D11 = 0
22 ↗ D12 EXOR D13 = 0
23 ↗ D14 EXOR D15 = 0
24 ↗ P(16,6,7,17) EXOR D17 = 0
25 ↗ D18 EXOR P(8,19,9,18) = 0

FIG. 8

| | DISK 0 | DISK 1 | DISK 2 | DISK 3 | DISK 4 | |
|---|---|---|---|---|---|---|
| ROW 0 | P,N1<br>P,N1 | D,N1,0<br>D,N1,1 | D,N1,2<br>D,N1,3 | D,1,20<br>D,1,21 | D,1,22<br>D,1,23 | BLOCK 0<br>BLOCK 1 |
| ROW 1 | D,N1,4<br>D,N1,5 | P,N1<br>P,N1 | D,N1,6<br>D,N1,7 | D,1,24<br>D,1,25 | D,1,26<br>D,1,27 | BLOCK 2<br>BLOCK 3 |
| ROW 2 | D,N1,8<br>D,N1,9 | D,N1,10<br>D,N1,11 | P,N1<br>P,N1 | D,1,28<br>D,1,29 | D,1,30<br>D,1,31 | BLOCK 4<br>BLOCK 5 |
| ROW 3 | D,N1,32<br>D,N1,33 | D,N1,12<br>D,N1,13 | D,N1,14<br>D,N1,15 | P,1<br>P,1 | D,1,34<br>D,1,35 | BLOCK 6<br>BLOCK 7 |
| ROW 4 | D,N1,16<br>D,N1,17 | D,N1,38<br>D,N1,39 | D,N1,18<br>D,N1,19 | D,1,36<br>D,1,37 | P,1<br>P,1 | BLOCK 8<br>BLOCK 9 |
| | ↑<br>COL. 0 | ↑<br>COL. 1 | ↑<br>COL. 2 | ↑<br>COL. 3 | ↑<br>COL. 4 | |

41 → x = LARGEST λ WHERE FBλ ≤ LA

42 → RN = [(LA-FBx) INTDIVIDE (BPC)] INTDIVIDE (DCPRx)

43 → PCN = (RN) REMDIVIDE (DC)

44 → DCN = [((LA-FBx) INTDIVIDE (BPC)) INTDIVIDE (DCPRx)] + (PDCx)
     = ABOVE PLUS 1 IF PCN ≤ DCN

45 → PBN = (RN) (BPC) + [(LA) REMDIVIDE (BPC)]

| PARABETERS WHICH DEFINE DISK ARRAY | MEANING |
|---|---|
| FB$\lambda$ ($\lambda$=0,1,...) | LOGICAL ADDRESS OF THE FIRST DATA BLOCK IN DISK SET $\lambda$ |
| DCPR$\lambda$ ($\lambda$=0,1,...) | DATA CHUNKS PER ROW IN SET $\lambda$ |
| PDC$\lambda$ ($\lambda$=0,1,...) | DATA CHUNKS PER ROW WHICH PRECEDE DISK SET $\lambda$ |
| OC | NUMBER OF COLUMNS IN ORIGINAL SET OF DISKS |
| BPC | NUMBER OF BLOCKS PER CHUNK |
| LOGICAL ADDRESS IN DISK ARRAY | |
| LA | LOGICAL ADDRESS USED BY A READ/WRITE COMMAND TO SELECT A PARTICULAR DATA BLOCK 'B' IN THE ARRAY |
| PHYSICAL ADDRESS IN DISK ARRAY | |
| PCN | NUMBER OF THE COLUMN WHICH CONTAINS PARITY BLOCK FOR DATA BLOCK 'B' |
| DCN | NUMBER OF THE COLUMN WHICH CONTAINS DATA BLOCK 'B' |
| PBN | NUMBER OF PHYSICAL BLOCK WHICH CONTAINS DATA BLOCK 'B' AND CORRESPONDING PARITY BLOCK |
| RN | NUMBER OF THE ROW WHICH CONTAINS DATA BLOCK 'B' |

FIG. 12

| EQUATION FROM FIG.11 | SUBSTITUTION OF VALUES INTO FIG.11 EQUATION |
|---|---|
| 41 | FBi = LARGEST FBi ≤ 31<br>∴ x = 1 |
| 42 | RN = [(31-20) INTDIVIDE(2)] INTDIVIDE(2) = 2 |
| 43 | PCN = [2] REMDIVIDE(3) = 2 |
| 44 | DCN = [[(31-20) INTDIVIDE(2)] REMDIVIDE(2)]+(2) = 3<br>BUT PCI ≤ DCI<br>∴ DCI = 3+1 = 4 |
| 45 | PBN = (2)(2) + [(3) REMDIVIDE(2)] = 5 |

METHOD OF INCREASING THE STORAGE CAPACITY OF A LEVEL FIVE RAID DISK ARRAY BY ADDING, IN A SINGLE STEP, A NEW PARITY BLOCK AND N— 1 NEW DATA BLOCKS WHICH RESPECTIVELY RESIDE IN A NEW COLUMNS, WHERE N IS AT LEAST TWO

BACKGROUND OF THE INVENTION

This invention relates to methods of increasing the storage capacity of a Level Five RAID disk array and the expanded array which is produced by such methods.

In the prior art, the term "RAID" disk array has been defined to mean any Redundant Array of Inexpensive Disks; and several different RAID disk arrays have been defined. These include a Level One RAID disk array, a Level Three RAID disk array and a Level Five RAID disk array. See "A Case for Redundant Arrays of Inexpensive Disks (RAID)" by Patterson, et al., Report No. UCB/CSD 87/391, December 1987, Computer Science Division of the University of California at Berkeley.

With a Level Five RAID disk array, both parity and data are striped across a set of several disks. FIG. 1 shows one example of a Level Five RAID disk array in which the array resides on a set of three disks that are labeled Disk 0, Disk 1, and Disk 2. Each disk stores data chunks "D" and parity chunks "P" in one particular column of the array. Each row of the array contains one parity block and two data blocks which are striped across all three of the disks.

In FIG. 1, the first row of the array consists of parity block P(0,1), data chunk D0, and data chunk D1. Also in the FIG. 1 array, the first column consists of parity chunk P(0,1), data chunk D2, data chunk D4, parity chunk P(6,7), and data chunk D8.

Each data chunk and each parity chunk is partitioned on a disk into several physical blocks. A single block is the smallest portion of a chunk that can be separately addressed by a user program with a read or write command. As one simple example, each chunk can consist of two blocks, and each block can consist of 512 bytes plus one cyclic redundant check byte (the "CRC" byte).

In the FIG. 1 array, block 0 in chunk 0 is addressed by a read/write command with a logical address of 0. As this logical address is sequentially incremented by one, the data blocks are addressed the following order: block 1 of chunk D0, block 0 of chunk D1, block 1 of chunk D1, block 2 of chunk D2, block 3 of chunk D2, block 2 of chunk D3, etc. For example, block 6 of chunk D7 has a logical address of 14.

When a block of data is written, the CRC byte within that block is also generated and written. Further, the parity block which has the same block number as the data block is also generated and written. This parity block is written using odd parity or even parity.

With even parity, the exclusive-or of a parity block and all data blocks that have the same block number produces a block of all "0's". For example, when block 0 of chunk D0 is written, block 0 of parity chunk P(0,1) is also written such that it exclusive-or'd with block 0 of chunks D0 and D1 equals a block of all "0's". Conversely, with odd parity, the exclusive-or of a parity block and all data blocks that have the same block number produce a block of all "1's".

During the execution of a read command, the CRC is regenerated from the block of data that is read. If the regenerated CRC differs from the stored CRC, then the block of data which is read contains an error. To correct this error, the erroneous data block is regenerated by a) reading all of the other blocks on the disks which have the same block number as the erroneous data block; and b) exclusive-oring those blocks together.

Consider now the situation where the storage capacity of the FIG. 1 array needs to be increased. One example of how the storage capacity of the FIG. 1 array can be increased in accordance with the prior art is shown in FIG. 2. There, the rows of the FIG. 1 array are expanded by an additional set of two new disks (Disk 3 and Disk 4). As a result, each row in the FIG. 2 array contains a total of five chunks, whereas each row in the FIG. 1 array contains only three chunks. Each chunk in the FIG. 2 array is again partitioned on a disk into several physical blocks, but to simplify the figures these blocks are not shown.

To change the FIG. 1 array to the FIG. 2 array, several steps S1–S6 as shown in FIG. 3 need to be performed. In step S1, the FIG. 1 array is taken "off-line", which means the array cannot be accessed by commands in any user program. Next in steps S2, the content of all data blocks in the FIG. 1 array are read and stored on back-up media, such as magnetic tape.

In step S3, an array configuration map is generated which defines the arrangement of the data blocks and the parity blocks on the disks as shown in FIG. 2. In step S4, the new parity blocks for the FIG. 2 array are generated and stored on the disks 0–4. In step S5, the data blocks are read from the back-up media and written on the disks 0–4. Then in step S6, the FIG. 2 array is put "on-line", which means that the array can now accept commands from a user program.

However, a major drawback with the above-described method of FIG. 3 is that it takes too much time to complete. This is because each of the steps S2, S4 and S5 reads and/or writes huge amounts of data. Step S2, for example, requires a read and a write of every data block on the initial set of disks. Typically, the steps S2–S5 take several hours to complete; and consequently, the FIG. 1 array must be taken off-line while it is expanded.

Accordingly, a primary object of the present invention is to provide a novel method of adding storage capacity to a Level Five RAID disk array in which the above drawback is overcome.

BRIEF SUMMARY OF THE INVENTION

In accordance with one embodiment of the present invention, the storage capacity of a Level Five RAID array on an initial set of disks is expanded by the steps of: A) adding to the rows of the array, new data blocks but no parity blocks which reside on an additional set of disks; and, B) initializing the new data blocks such that the exclusive-or of their content in each row of the array is zero. Due to these steps A) and B), the data blocks and parity blocks on the initial set of disks stay unchanged, and thus steps S2–S5 of FIG. 3 are eliminated.

In accordance with another embodiment of the present invention, the storage capacity of a Level Five RAID array on an initial set of disks is expanded by the steps of: A) changing a parity block to a data block in a particular row on the initial set of disks, without altering the content of the changed block; B) adding in that particular row, one new parity block and N–1 new data blocks which reside on an additional set of N disks; and, C) initializing that new parity block and new data blocks such that the exclusive-or of their content is zero. By these steps A–C, the context of the data blocks and parity blocks on the initial set of disks again remains unchanged; and further the additional set of disks contain a parity block as well as data blocks.

BRIEF DESCRIPTION OF THE DRAWINGS

FIG. 2 shows how the storage capacity of the FIG. 1 array is expanded, in the prior art, on an additional set of two new disks.

FIG. 3 shows the prior art steps by which the FIG. 1 array is expanded to the FIG. 2 array.

FIG. 4 shows how the storage capacity of the FIG. 1 array is expanded, in accordance with one embodiment of the present invention, on an additional set of two new disks.

FIG. 5 shows several constraints which must be met by the expanded array of FIG. 4.

FIG. 6 shows an array configuration map which assigns attributes and logical addresses to the data blocks and parity blocks in the FIG. 4 array.

FIG. 7 shows how the storage capacity of the FIG. 1 array is expanded, in accordance with a second embodiment of the present invention, on an additional set of two new disks.

FIG. 8 shows several constraints which must be met by the expanded array of FIG. 7.

FIG. 9 shows an array configuration map which assigns attributes and logical addresses to data blocks and parity blocks in the FIG. 7 array.

FIG. 11 shows several equations which convert the logical address of a data block in the FIG. 4 array to the physical addresses for that data block and its corresponding parity block.

FIG. 12 shows a definition for each of the variables which occur in the FIG. 11 equation.

FIG. 13 shows particular values for certain variables in FIG. 12 which correspond to the disk array of FIG. 4.

DETAILED DESCRIPTION

Figure 1:
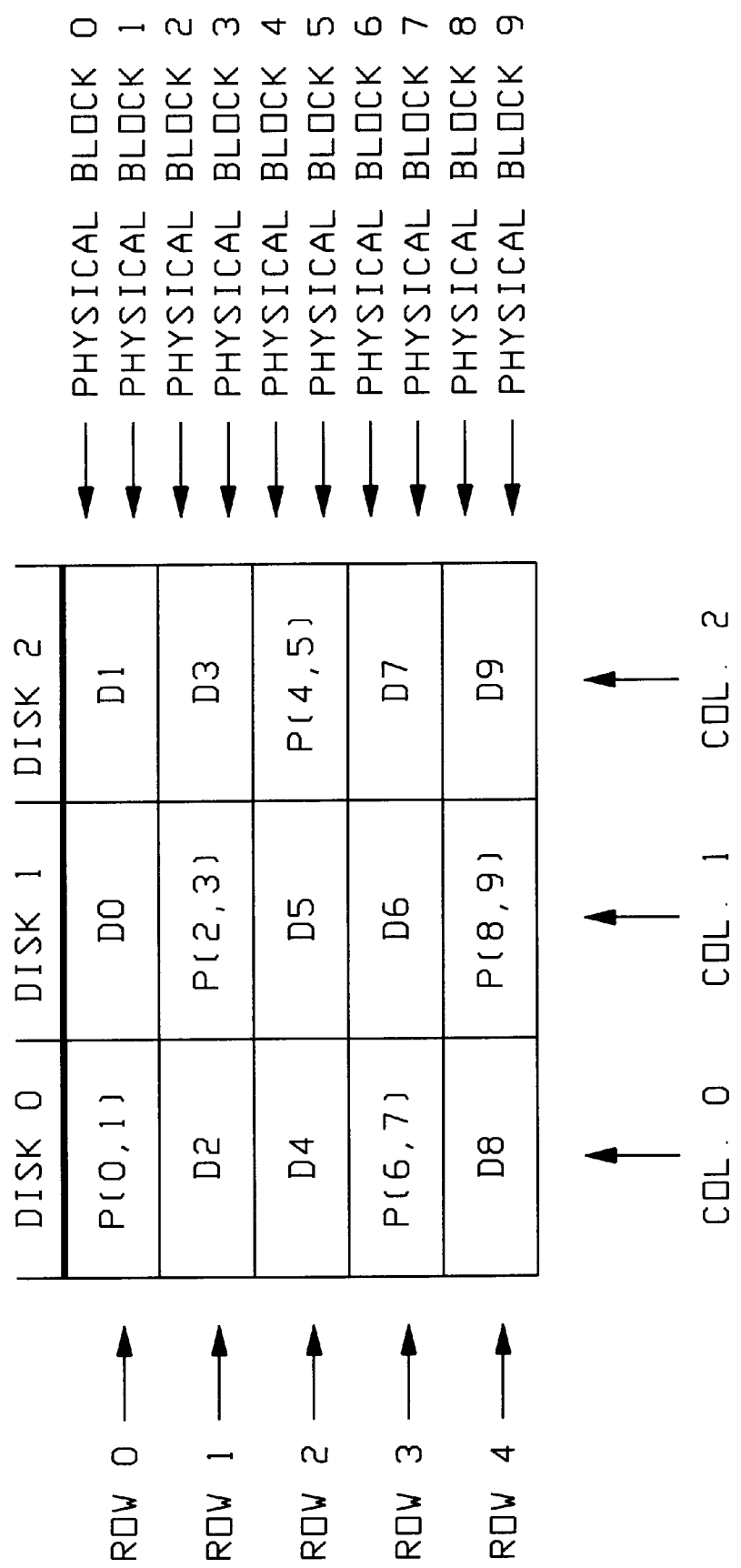
FIG. 1 shows the structure of a prior art Level Five RAID array which resides on an initial set of three disks.

In FIG. 4, a Level Five RAID disk array is shown which is obtained by increasing the storage capacity of the FIG. 1 array in accordance with the present invention. This FIG. 4 array resides on the initial set of three disks (disk 0, disk 1, and disk 2) from FIG. 1 plus an additional set of two new disks (disk 3 and disk 4).

Within the FIG. 4 array, data chunks D and parity chunks P are arranged as shown in five rows and five columns. Row 0, for example, consists of parity chunk P(0,1,10,11) and data chunks D0, D1, D10, D11. Column 0 consists of parity chunks P(0,1,10,11) and P(6,7,16,17) and data chunks D2, D4, and D8.

Each data chunk and each parity chunk is partitioned on a disk into several physical blocks. These blocks are just like those which were previously described in conjunction with FIG. 1, and thus they are not shown again in FIG. 4. Also in the FIG. 4 array, the parity chunks and/or parity blocks serve the same function as they do in the FIG. 1 array.

For example, when block 0 of chunk D0 is written, block 0 of parity chunk P(0,1,10,11) is also written. If even parity is used, block 0 of P(0,1,10,11) exclusive-or'd with block 0 of chunks D0, D1, D10 and D11 equals a block of all "0's". Thereafter, during the execution of a read command, an erroneous data block is regenerated by a) reading all of the other blocks on the disks which have the same block number as the erroneous data block; and b) exclusive-oring those blocks together.

One distinguishing feature of the FIG. 4 array is that only data chunks, and no parity chunks, are written on disks 3 and 4. By comparison, in the prior art array of FIG. 2, data chunks and parity chunks are written on the disks 3 and 4.

A second distinguishing feature of the FIG. 4 array is that the data chunks and parity chunks on disks 0–2 are arranged in the same order and have the same content as they do in the FIG. 1 array. By comparison, in the prior art array of FIG. 2, the data chunks on disks 0–2 are different than they are in FIG. 1.

Another distinguishing feature of the FIG. 4 array is that the data chunks on disks 3 and 4 are initialized such that the parity chunks on disks 0, 1 and 2 are identical to the parity chunks in the FIG. 1 array. This is achieved by initializing the data chunks on disks 3 and 4 such that several constraints 11–15 as shown in FIG. 5 are met.

Constraint 11 insures that the parity chunk P(0,1,10,11) in the FIG. 4 array is made identical to parity chunk P(0,1) in the FIG. 1 array. According to constraint 11, the data chunks D10 and D11 must be initialized such that their exclusive-or equals a chunk of all "0's". This chunk of all "0's" exclusive-or'd with D0 and D1 will equal P(0,1). Thus, it follows that P(0,1,10,11) will equal P(0,1).

One particular example of how the constraint 11 may be met is to initialize data chunk D10 to a block of all "1's" or all "0's", and initialize data chunk D11 to the same bit pattern. A second example of how constraint 11 may be met is to initialize data chunk D10 to any random bit pattern or predetermined bit pattern, and initialize the data chunk D11 to the same bit pattern.

S1milarly, each of the other constraints 12–15 insures that the parity chunk in one row of the FIG. 4 array is made identical to the parity chunk in the same row of the FIG. 1 array. For example, constraint 12 says that the data chunks D12 and D13 must be initialized such that their exclusive-or equals a chunk of all "0's". This chunk of all "0's" exclusive-or'd with D2 and D3 will equal P(2,3). Thus, it follows that P(2,3,12,13) will equal P(2,3).

From the above description of FIGS. 4 and 5 it is seen that in accordance with the present invention, the storage capacity of any initial Level Five RAID disk array is increased by the steps of: A) adding to the rows of the initial array, new data blocks but no parity blocks which reside on an additional set of disks; and, B) initializing the new data blocks such that the exclusive-or of their content in each row of an array is zero. One way in which steps A) and B) can be implemented is shown in FIG. 6.

FIG. 6 is an array configuration map for the disk array of FIG. 4. This map is in the form of a table with rows and columns in which one entry is made for each block in the FIG. 4 array; and, each such entry consists of an attribute P or D, as an attribute I or NI, and a logical address.

Each block which has an attribute P is a parity block, and each block which has an attribute D is a data block. Also, each block which has an attribute I is in an initial state wherein the contents of the block as stored as an actual disk is pre-empted with a predetermined content which meets the constraints 11–15 of FIG. 5. Conversely, each block which has an attribute NI is not in an initial state, and the contents of such a block is actually stored on a disk.

For example, the block with logical address 0 in the FIG. 6 array configuration map has the attributes P, NI. This indicates that block 0 on disk 0 in the FIG. 4 Level Five RAID disk array is a parity block which is not in an initial state. S1milarly, the block with logical address 29 in FIG. 6 has the attributers D, I. This indicates that block 5 on disk 3 in the FIG. 4 disk array is a data block which is in its initial state.

A primary feature of the above described invention of FIGS. 4–6 is that it enables the storage capacity of a Level Five RAID disk array to be increased much faster than the prior art method of FIG. 3. Specifically, by performing the above described steps A and B, the FIG. 3 step S2 of backing-up the data chunks from the initial array is eliminated; the FIG. 3 step S4 of generating and writing new parity blocks is eliminated; and the FIG. 3 step S5 of restoring data from back-up media to the new array is eliminated. As a result, the above steps A) and B) can be performed in less than one minute.

This time interval is so short that steps A and B can be performed while any user programs which address the array with read and/or write commands are kept on-line. Those commands are accumulated in a queue while steps A and B are performed; and when steps A and B are complete, the commands are removed from the queue and executed. Thus, with the present invention, the FIG. 3 steps S1 and S6 can also be eliminated.

Turning now to FIG. 7, another Level Five RAID disk array is shown which constitutes a second embodiment of the present invention. This FIG. 7 array is similar to the FIG. 4 array in that it resides on disks 3 and 4 from FIG. 4 plus the initial set of three disks (disk 0, disk 1, and disk 2) from FIG. 1.

Within the FIG. 7 array, data chunks D and parity chunks P are arranged as shown in five rows and five columns. Here again, each data chunk and each parity chunk is partitioned on a disk into several physical blocks just like those which were previously described in conjunction with FIG. 1; and thus for simplicity, these blocks are not repeated in FIG. 7. Also, the parity chunks and/or parity blocks in the FIG. 7 array serve the same function as they do in the arrays of FIGS. 1 and 4.

One distinguishing feature of the FIG. 7 array over the FIG. 4 array is that in FIG. 7, data chunks and parity chunks are written on disks 3 and 4. By comparison, in the FIG. 4 array, data chunks but no parity chunks are written on the disks 3 and 4.

A second distinguishing feature of the FIG. 7 array is that the data chunks on disks 0–2 are arranged in the same order and have the same content as they do in the FIG. 1 array. By comparison, in the prior art array of FIG. 2, the data chunks on disks 0–2 are different than they are in the FIG. 1 array.

Another distinguishing feature of the FIG. 7 array is that the data chunks and parity chunks on disks 3 and 4 are initialized such that several constraints 21–23 in FIG. 8 are met. Constraints 21–23 in FIG. 8 are the same as the previously described constraints 11–13 in FIG. 5; but constraints 24–25 of FIG. 8 are new.

Constraint 24 insures that data chunk D16 in the FIG. 7 array is made identical to parity chunk P(6,7) in the FIG. 1 array. According to constraint 24, the parity chunk P(16,6, 7,17) and data chunk D17 must be initialized such that their exclusive-or equals a chunk of all "0's". This chunk of all "0's" exclusive-or'd with D6 and D7 will equal P(0,1). Thus, it follows that D16 will equal P(0,1).

Similarly, constraint 25 insures that data chunk D19 in the FIG. 7 array is made identical to parity chunk P(8,9) in the FIG. 1 array. According to constraint 25, the data chunk D18 and parity chunk P(8,19,9,18) be initialized such that their exclusive-or equals a chunk of all "0's". This chunk of all "0's" exclusive-or'd with D8 and D9 will equal P(0,1); and thus D19 will equal P(0,1).

From constraints 24 and 25 of FIG. 8, it is seen that in accordance with the present invention, the storage capacity of any Level Five RAID array on an initial set of disks is increased by the steps of: A) changing a parity block to a data block in a particular row of the initial array, while keeping the content of those two blocks the same; B) adding in that particular row, one new parity block and N–1 new data blocks which reside on an additional set of N disks; and, C) initializing the new parity block and new data blocks such that the exclusive-or of their content is zero. One way to implement these steps A), B), and C) is shown in FIG. 9.

FIG. 9 is an array configuration map for the disk array of FIG. 7. In this map, one entry is made for each block in the FIG. 7 array; and, each such entry consists of an attribute P or D, an attribute I or NI, and a logical address.

In the FIG. 9 array configuration map, the block with a logical address of 32 has the attributes D, NI. This indicates that the block 6 on disk 0 in the FIG. 7 Level Five RAID disk array is a data block which is not in an initial state. S1milarly, the block with a logical address of 35 has the attributes D, I. This indicates that block 7 on disk 4 in the FIG. 7 disk array is a data block which is in the initial state.

With the above described method of FIGS. 7–9, the storage capacity of a Level Five RAID disk array is again increased much faster than the prior art method of FIG. 3. This speed increase occurs because the method of FIGS. 7–9 eliminates the FIG. 3 steps S2, S4 and S5.

Also, another feature of the method of FIGS. 7–9 is that it expands the initial array such that the parity blocks are striped across all of the disks. This feature is important because it can increase the speed with which certain simultaneous write commands are executed.

Suppose, for example, that one user program writes a data block with logical address 2, and simultaneously another user program writes a data block with logical address 12. In FIG. 9, the respective parity blocks for those two data blocks are on two separate disks, and thus those parity blocks can be written concurrently. By comparison, in the FIG. 4 array, the respective parity blocks for those two data blocks are on the same disk, and thus the parity blocks need to be written sequentially.

Figure 10:
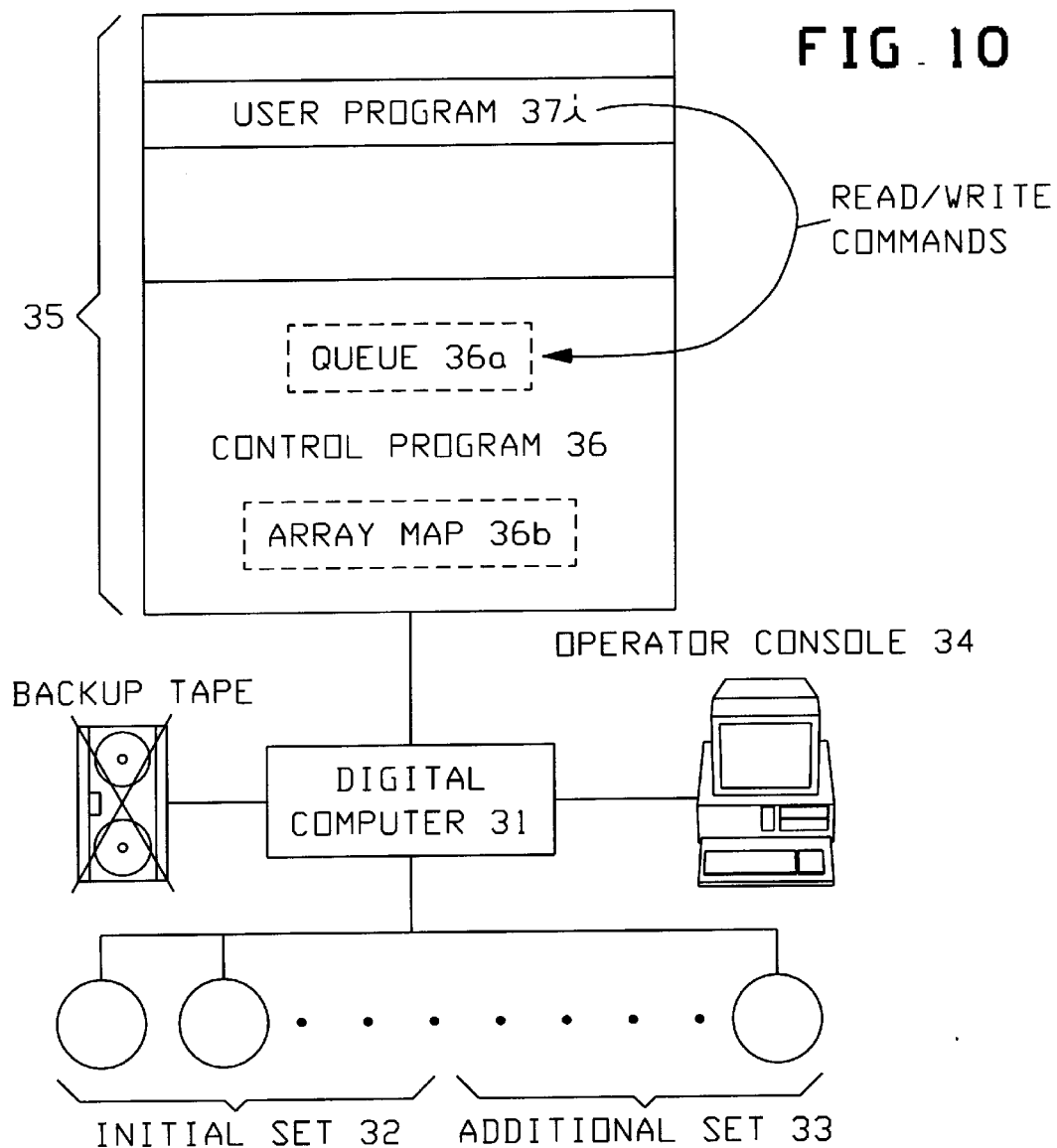
FIG. 10 shows a data processing system which includes a control program that expands the initial array of FIG. 1 to the array of FIG. 4 or FIG. 7.

Next, with reference to FIG. 10, a complete data processing system will be described which increases the storage capacity of an initial Level Five RAID array in accordance with the method of FIGS. 4–6 and/or the method of FIGS. 7–9. This data processing system includes: a digital computer 31, an initial set of disks 32, an additional set of disks 33, an operator console 34, and a program memory 35. All of those components 31–35 are intercoupled as shown.

On the set of disks 32, data blocks and parity blocks are arranged to form an initial Level Five RAID array, such as the array of FIG. 1. That initial array is subsequently expanded by forming additional data blocks on the set of disks 33 in accordance with the method of FIGS. 4–6, or by forming additional data blocks and parity blocks on the set of disks 33 in accordance with the method of FIGS. 7–9.

Stored within the program memory 35 of the computer 31 is an array control program 36 and a plurality of user programs, one of which is shown as program 37i. Each user program includes read and write commands which select the data blocks on the disks 32 and 33 with a logical address. When such a command is encountered during the execution of a user program, that command is sent to a queue 36a in the array control program 36.

All read and write commands which are stored in the queue 36a are executed by the control program 36. Thus the control program 36 operates as an interface between the user programs and the array which is stored on the disks 32 and 33. When the execution of read command is completed, the control program 36 passes the data which was read to the user program.

Also the control program 36 includes an array configuration map 36b which identifies the attributes D, P, I and NI of each of the blocks on the disks 32 and 33, and which assigns a logical address to each of those blocks. To expand the array via the method of FIGS. 4–6 or the method of FIGS. 7–9, the map 35b is modified by the control program 36.

When the array is expanded by the method of FIGS. 4–6, the modified map A) adds new data blocks to the rows of the array; and, B) initializes the new data blocks such that the exclusive-or of their content in each row of the array is zero. When the array is expanded by the methods of FIGS. 7–9, the modified map A) changes a parity block to a data block in a particular row on the initial array, while keeping the content of those two blocks the same; B) adds in the particular row, one new parity block and N−1 new data blocks which reside on an additional set of N disks; and, C) initializes the new parity block and new data blocks such that the exclusive-or of their content is zero.

In the array configuration maps of FIGS. 6 and 9, a logical address is included for each block in the disk array; and each logical address is correlated by the rows and columns of the map to a particular block on a particular disk. But as an alternative, equations can be used to correlate each logical address to a particular block on a particular disk, in which case the logical address can be deleted from the array configuration map.

FIG. 11 shows several equations 41–45 which convert a logical address of a data block in a disk array to a physical data block on one particular disk and a physical parity block on another disk, when the disk array has been expanded in accordance with the method of FIGS. 4–6. In these equations, the operators "intdivide" and "remdivide" are used. Intdivide means perform a division as usual but ignore the remainder. Remdivide means perform a division as usual but ignore the quotient. Also in these equations, several variables occur; and each such variable is defined in FIG. 12.

Five of the variables in FIG. 12 are FBi, DCPRi, FDCi, OC, and BPC. These are parameters which define a disk array. For example, for the disk array of FIG. 4, the above parameters have the values which are shown in FIG. 13.

Another variable in FIG. 12 is the logical address LA which is used by a read/write command to select a particular data block in the array. For example, when LA=31, then it is seen from FIG. 6 the block 5 on disk 4 is selected. This same result is obtained by substituting the values of LA=31 and the parameters of FIG. 13 into the equations 41–45 of FIG. 11; and these substitutions are made in FIG. 14.

Figures 14, 15:
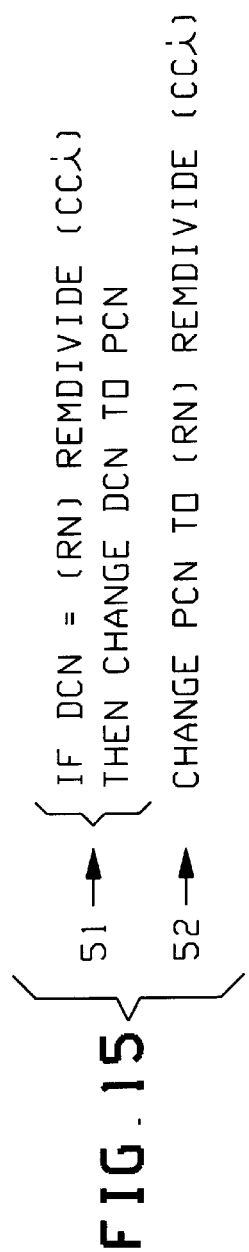
FIG. 14 shows how the values of FIG. 13 are substituted into the equations of FIG. 11 to convert the logical address of a particular data block to the physical addresses for that same data block and its corresponding parity block.
FIG. 15 shows a modification which is made to the FIG. 11 equations to convert the logical address of a data block in the FIG. 7 array to the physical addresses for that data block and its corresponding parity block.

Equation 44 in FIG. 14 shows that when LA=31, the corresponding number of the column which contains the addressed data block is given by DCN=4. Also, Equation 45 of FIG. 14 shows that the corresponding physical block number is given by PBN=5. Further, Equation 43 in FIG. 14 shows that the column which contains the corresponding parity block for LA=31 is given by PCN=3.

Similarly, FIG. 15 shows two equations 51 and 52 which are used with the equations 41–45 of FIG. 11 to convert the logical address of a data block in a disk array to the physical address of a data block on one disk and corresponding parity block on another disk when the array has been expanded in accordance with the method of FIGS. 7–9. In the equations 51 and 52, the variables DCN, RN, and PCN have the same meaning as they do in the FIG. 11 equations, and another variable CCi is introduced. Variable CCi is the number of columns in the i-th disk set plus all preceding disk sets, beginning with i=1; and thus equations 51–52 are evaluated once for each additional disk set in the expanded array.

For example, consider the case for the array of FIGS. 7–9 where the logical address of the data block in a read/write command is LA=33. That logical address is converted by equations 41–45 to the physical addresses of PCN=0, DCN= 3, PBN=7, RN=3. But from equation 51, the quantity (RN)remdivide(CC1) equals (3)remdivide(5) or 3; and that equals DCN as given by equation 44. Thus, DCN is changed to equal PCN or "0". Then, by equation 52, PCN is changed to (3)remdivide(5) or 3.

In the array configuration maps of FIGS. 6 and 9, each block on the additional disks 4–5 is assigned an attribute I to indicate that the contents of the block as stored on a disk is pre-empted with a predetermined content which meets the constraints of FIGS. 5 or 8. But as an alternative, that predetermined content can be actually written onto the disks 4–5 before those disks are added to the disk array. Also, this writing of the disks 4–5 can be performed while the user programs are executing read and write commands on the initial set of disks 1–3, and thus the disks 1–3 can remain on line. With this modification, the attributes I and NI are deleted from the array configuration maps of FIGS. 6 and 9 because all blocks are in an NI state.

Two preferred methods of increasing the storage capacity of a Level Five RAID Disk Array, as well as various modifications to those methods, have now been described in detail. Accordingly, it is to be understood that the present invention is not limited to the details of any one particular method but is defined by the appended claims.

What is claimed is:

1. A method of adding storage capacity to a first Level Five RAID disk array in which data blocks and parity blocks reside in an initial set of rows and an initial set of columns on an initial set of disks; said method including the steps of:

expanding said first array into a second array by concurrently adding N new columns to said initial set of rows which reside on an additional set of disks, where N is an integer larger than one;

selecting a particular row in said first and second arrays;

changing a parity block to a data block in said particular row within said first array, while keeping the content of those two blocks the same;

adding one new parity block and N−1 corresponding new data blocks which respectively reside in said N new columns on said particular row;

repeating said selecting, changing, and adding steps in a sequence where said one new parity block is never added to the same new column twice in succession; and, initializing each new parity block and corresponding N−1 new data blocks such that the exclusive-OR of their content is zero.

2. A method according to claim 1 wherein said initializing step includes the substep of storing attribute bits for said new parity block and new data blocks which indicate that their content as actually stored on said additional set of disks is pre-empted with a predetermined content.

3. A method according to claim 1 wherein said initializing step includes the substep of writing the content of said new parity block and new data blocks in an off-line mode during which said additional set of disks are decoupled from said array, but said initial set of disks are readable and writable in said array.

4. A method according to claim 1 wherein said changing and adding step s include the substep of assigning logical addresses to said new data blocks and changed parity block, and correlating each logical address to a physical block on said disks by an array configuration map.

5. A method according to claim 1 wherein said changing and adding steps include the substep of assigning logical addresses to said new data blocks and changed parity block, and correlating each logical address to a physical block on said disks by a set of equations.

6. A method according to claim 1 wherein said changing, adding and initializing steps are performed while read and write commands for said array are received and a cumulated in a queue.

7. A method according to claim 1 wherein said changing, adding and initializing steps are completed in a time interval which lasts less than one minute.

8. A method according to claim 1 wherein said changing and adding steps include the substep of storing attribute bits for said new data blocks and changed parity block which distinguish them from a parity block.

9. A method according to claim 1 wherein said additional set of N disks includes more than one disk, and said initializing step includes the substep of setting the content of at least two of said new parity block and new data blocks to a non-zero state.

10. A method according to claim 1 wherein said initializing step includes the substep of setting all of said new data blocks and new parity block to a zero state.

* * * * *